April 19, 1949.   H. J. KERR ET AL   2,467,391
METHOD OF PRESSURE WELDING METALS BY PREHEATING
WITH PRESSURE APPLICATION IN THE SOLIDUS
PHASE AND ELECTRIC RESISTANCE HEATING
IN THE LIQUIDUS PHASE
Filed March 21, 1944
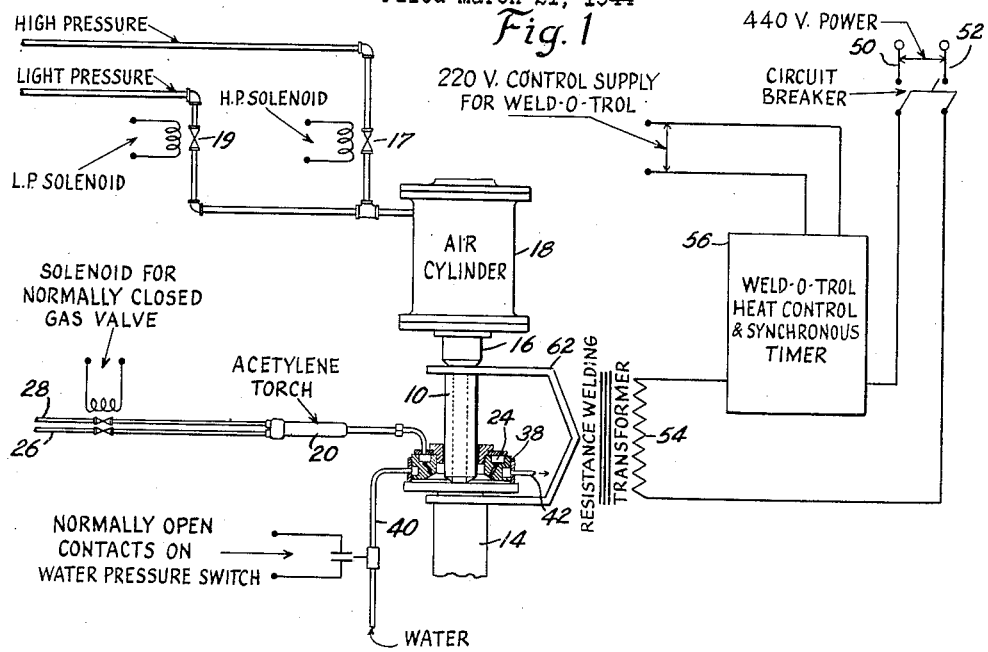
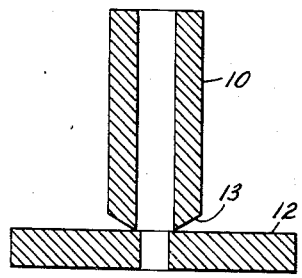
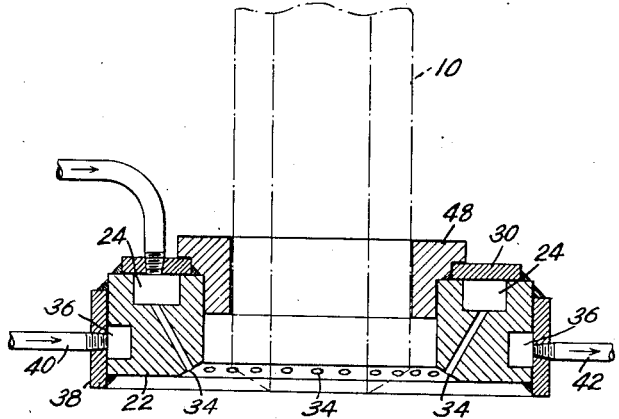
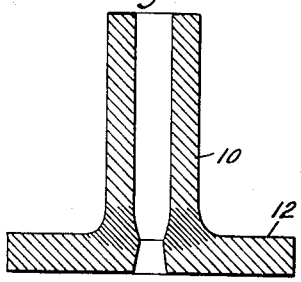
INVENTORS
OTIS R. CARPENTER
FRANK W. ARMSTRONG, JR.
NICHOLAS C. JESSEN &
HOWARD J. KERR
ATTORNEY Patented Apr. 19, 1949

2,467,391

UNITED STATES PATENT OFFICE 2,467,391

METHOD OF PRESSURE WELDING METALS BY PREHEATING WITH PRESSURE APPLICATION IN THE SOLIDUS PHASE AND ELECTRIC RESISTANCE HEATING IN THE LIQUIDUS PHASE

Howard J. Kerr, Westfield, N. J., and Otis R. Carpenter, Barberton, Frank W. Armstrong, Jr., Barberton, and Nicholas C. Jessen, Akron, Ohio, assignors to The Babcock & Wilcox Company, Rockleigh, N. J., a corporation of New Jersey Application March 21, 1944, Serial No. 527,432

5 Claims. (Cl. 219—10)

This invention relates to a method of electrical resistance butt welding in which all of the welding heat is not supplied by the electrical resistance of the electric current passage through the juncture alone, as is customary in this type of welding, but is partially supplied by a preheating system applied before the application of an electric current.

An object of this invention is to provide a method of electrical resistance butt welding which will reliably produce good welds without the uncertain aspects commonly associated with straight electric resistance butt welding.

Another object is to provide a method of welding in which the care or preparation of weld surfaces need not be as particular as is common for electric resistance butt welding.

A further object is to reduce the current density requirement per unit of area welded over that customarily required for electric resistance butt welding.

Another object is to provide a method which involves expelling oxides and dirt from the fusion zone of the weld, which is not possible with common electric resistance butt welding but at the same time avoiding the large flash and spatter associated with electric flash welding.

A further object is to make possible the welding of alloy steels such as low chrome alloys, austenitic materials and high chrome alloys, heretofore impossible in common electric resistance butt welding.

Other objects of the invention will appear in the accompanying description which refers to the drawings in which apparatus for carrying out the illustrative method is diagrammatically illustrated.

In the drawings:

Fig. 1 is a diagrammatic view of apparatus employed in practicing the invention;

Fig. 2 is a vertical section of the oxy-acetylene burner or heating ring employed in the Fig. 1 apparatus;

Fig. 3 is a vertical section showing work elements as they are associated at the initiation of the illustrative method;

Fig. 4 is a vertical section through the work after the weld has been completed.

The welding method is illustrated by the juncture of such a tubular section as 10 to a plate section or flange piece 12, shown in the drawings. Other components or sections can also be successfully joined by the method. The tube 10 is first machined at one end to form a conical surface 13, limiting the area of contact. These elements are then set-up and abutted together as indicated in Fig. 1, with the reduced contact surface of the machined tube end abutted against the flange piece and the two pieces arranged in operative relationship between the fixed member 14 and the movable member 16 of the pressure apparatus having the air cylinder 18, the inlet of which is connected with a high pressure valve 17 and a low pressure valve 19. During the operative assembly, a preheating device is disposed around the tube at the weld zone. As shown, the preheater includes the acetylene burner, indicated in its entirety at 20, placed at a position around the tube and adjusted in height to a fixed distance above the flange piece 12. This burner is so disposed and constructed as to have its flames impinge upon the metal of the flange piece which involves the predominating part of the metal in the weld zone.

The specific structure of the acetylene torch is shown in Fig. 2, and it involves a metallic body 22 having an annular gas chamber 24 formed therein, this gas chamber being connected by the tubes 26 and 28 to sources of oxygen and acetylene.

The gas chamber is indicated as closed by an annular ring 30 which is welded to the body 22 as shown in the drawing, and the combustible gaseous mixture is transmitted to the combustion zone by downwardly directed ducts 34 formed within the burner body. To prevent overheating of the burner an annular water chamber 36 is formed in the body 22 by recessing a circumferential part of the latter and then surrounding the body 22 with a ring 38 welded to the body as shown. Through this ring extend tubes 40 and 42 which communicate with the water chamber for the circulation of water therethrough.

In order to prevent excessive heating of the tube 10 during welding processes, a seal ring 48, machined so as to closely fit the outside diameter of the tube 10 and the inside diameter of the burner body 22, is arranged as indicated in the drawings. This construction controls the shape of the fillet formed during the welding process as a result of the upsetting of the metal at the end of the tube. The seal ring, being made of steel, also protects the heating tip of the tube from damage which otherwise might result from an excessive upset at the weld. By adjusting the space between the ring and the tube, the ring and the burner, and the height of the burner above the flange, the degree of preheat may also be controlled as to its distribution in the flange and the tube.

Preliminary steady pressure is applied by the illustrative apparatus before the welding process begins to maintain the facing surfaces of the workpieces in firm contact. This pressure is applied by the operation of the air cylinder 18, and the pressure may vary with the materials employed. For steel, a preferred steady pressure has been found to be within the range of 400 and 500 pounds per square inch, in the contact area. This pressure is also a function of the degree of preheat desired.

After the application of preliminary pressure over the joint contact area between the tube 10 and the flange piece 12, the burner 20 is lighted and the heating of the metal at the joint is begun.

It is preferable that the oxy-acetylene flame be maintained neutral, since oxidation and the carburization of the heated surfaces are equally undesirable. The inert atmosphere provided by the neutral flame envelope surrounding the heated surfaces of the weld assembly is relatively efficient in preventing oxidation, although such an atmosphere is not considered a prerequisite to this method of welding.

The preheating should proceed at such a rate that no premature melting of the metal surfaces occurs and the temperature of the entire cross-section rises reasonably uniformly. In the early stages of the heating, the expansion of the heated portion of the specimen effects a slight pressure increase in the air cylinder 18. This results in a load increase at the free end of the specimen over the original steady preheat pressure, and, as the preheating progresses, the increased load on the specimen and the plasticity of the hot metal result in a slight upset at the heated area. If the rate of heating is proper, the heated surfaces nearest the burner tips will now appear liquidus and the upset, due to preheat pressure at this instant, will be just sufficient to compensate for the expansion due to heating. The temperature increase therein increases the electrical resistance of the workpieces.

At this stage of the method, the preheater is preferably shut off, and a heavy current of electricity is instantly applied to the joint by means of the electrical system indicated schematically in Fig. 1.

Simultaneously, with the application of electric current to the weld zone, the steady pressure on the work is increased to a value many times of that of the originally applied pressure. Pressures in excess of 4,000 pounds per square inch are successfully employed.

The weld is permitted to "set" for a few seconds under the steady welding pressure, prior to its removal from the machine.

The degree of preheat obtained by the acetylene burner alone just prior to the application of current and welding pressure is such that the temperature of metal of the weld junction surface of the flange at the outer edge of the weld junction is approximately 2700° F. while temperature of the inner edge where tube and flange are in contact and under preliminary pressure is about 2350° F. Upon the application of electric current the inner edge temperature instantly rises to above 2700° F. and at the same time, because of the rapid rate of upset, the current passage raises the entire zone of the weld to a temperature at or beyond the liquidus temperature. Thus the heat gradient at the weld zone is evened out and the weld is made while the junction zone is heated to fusion temperatures over an extremely localized area without a flashing action as is commonly present with flash welding, and yet with the metal heated to temperatures in excess of those commonly associated with electric butt welding. At the same time, there is associated with the process a "magnetic blow" away from the inner electrical secondary current loop which expels to the outside of the fusion zone an accumulation of molten material containing oxides and dirt which may be present in the junction zone just prior to the upset of the weld. While flash welds have been characterized by comparatively small upsets and ragged lines of extruded flash and resistance butt welds have been characterized by small upsets with no flash, this new method is characterized by a larger upset, a function of the degree of preheat, and a smooth flowing magnetic expulsion of molten material away from the transformer loop.

The following considerations may be considered as demonstrating what actually occurs during the making of the weld. Assuming the weld is to be made between the flange section 12 and the tube section 10 machined to a 30° bevel with a 1/64" flat annulus, and assuming also that the steady preheat pressure at the free end of the tube is 450 pounds per square inch, the bearing pressure at the tube end, representing an area with approximately .074 square inch, is about 6000 pounds per square inch. At the instant of welding, when the steady welding pressure is first applied, the bearing pressure at the tube end may reach a value of 50,000–60,000 pounds per square inch, this maximum value decreasing as the upset progresses in a manner proportional to the increased bearing area at the fusion zone.

The acetylene preheating has a tendency to produce somewhat higher temperatures at the outside portion of the beveled tube area, partly because the outside area is closer to the flames, but also because the inside edge of the tube is in contact with the relatively heavy flange section which keeps this portion of the heated area at a lower temperature. At the flange section a similar heat gradient exists.

The angular direction of the acetylene flames with respect to the surface of the flange preferably forms an included angle of 60°.

Just prior to the instant when the welding current is applied the beveled surface of the pipe and the flange surface vertically opposite have reached the liquidus stage (approximately 2700° F.), whereas, the area of contact between the tube and the flange is at a temperature of the order of 2350° F. At this elevated temperature the electrical resistance between the tube and flange faces is extremely high, and the application of current of a density of approximately 170,000 amperes per square inch at the contact area produces a momentary melting of the metal at this location. This further increase in resistance at the area of contact results in a slight instantaneous flash which ejects the molten surface metal and any oxides present. Pressure applied at the same time stops the flash and produces a butt weld between oxide free faces.

The immediately foregoing analysis of the welding method phenomena applies to the welding of 1½" O. D. x ¾" I. D. low carbon steel pipe to a 5" O. D. x ½" thick steel flange. Similar considerations would apply to other shapes that may be welded by this method, except that the current and pressure values and the assembly of the equipment would vary with the type of weld to be formed.

With further reference to the application of the illustrative method to the welding of alloy steels, excellent welds have been produced between a 4–6 chromium steel pipe and flange with the following setup:

| | |
|---|---|
| Preheat time _____minutes__ | 7–9 |
| Preheat pressure ___pounds per square inch__ | 450 |
| Welding pressure _____do____ | 4,000–5,000 |
| Current _____amperes per square inch__ | 13,000 |
| Weld time _____cycles__ | 34 |
| Power input _____kv.-a. per square inch__ | 230 |

Welds produced under the above conditions, using a 1½″ O. D. x ¾″ I. D. pipe and a 5″ diameter x ⅝″ thick flange, which had a ⅝″ hole drilled through its center, were very good. The fracture indicated complete absence of oxidation and showed excellent fusion.

The degree of preheat input and welding pressure requirements are somewhat higher than in the case of low carbon steels. A 10% increase in compressive, thermal and electrical energy over the amounts used for low carbon steel is desirable for the welding of 4–6% chromium steel.

Since 4–6% chromium steel is of the air hardening type, careful heat treatment of the welded joint is essential.

The illustrative method has also been successfully employed in welding of steel parts containing approximately 18% chromium and approximately 8% nickel with the following setup:

| | |
|---|---|
| Preheat time _____minutes__ | 8–13 |
| Preheat pressure ___pounds per square inch__ | 775 |
| Welding pressure _____do____ | 7,200 |
| Current _____amperes per square inch__ | 13,000 |
| Weld time _____cycles__ | 44 |
| Power _____kv.-a. per square inch__ | 230 |

Perfect welds were produced with the above welding technique. The ductility of the welded joint after heat treatment (1950° F. water quench) was excellent and a specimen polished and etched in boiling 1:1 hydrochloric acid showed 100% fusion at the weld.

The compressive, thermal and electric energy requirements for welding 18–8 chromium-nickel steel are considerably higher than for low or unalloyed steels.

Welds are successfully made between 4″ O. D. tube with ½″ wall and 2″ thick flange.

| | |
|---|---|
| Preheat time _____minutes__ | 7 |
| Preheat pressure ___pounds per square inch__ | 450 |
| Welding pressure _____do____ | 5,000 |
| Current _____amperes per square inch__ | 20,000 |
| Weld time _____cycles__ | 35 |
| Power _____kv.-a. per square inch__ | 200 |

The apparatus described above is claimed in a separate divisional patent application, Serial No. 657,424, filed March 27, 1946.

What is claimed is:

1. A method of weld uniting metal workpieces comprising juxtaposing the workpieces with facing surfaces in abutting relation, applying a steady pressure to said workpieces to maintain them in firm contact, preheating the facing surfaces of the workpieces to raise the temperature thereof, thus effecting an increase in the electrical resistance of the workpieces and causing an expansion of the metal thereof to effect an increase in the contacting pressure, continuing such preheating and the application of such pressure until at least part of the metal of at least one of the facing surfaces has entered the liquidus phase, thereupon simultaneously substantially increasing the steady pressure on the workpieces and effecting a flow of electric welding current across the weld zone to bring all of the metal of the facing surfaces within the liquidus phase, and then discontinuing the electric welding current while maintaining the workpieces in set relation for at least a limited time after such current discontinuation.

2. A method of weld uniting metal workpieces comprising reducing the facing surface of one of the workpieces to reduce the area of contact of the workpieces, juxtaposing the workpieces with facing surfaces in abutting relation, applying a steady pressure to said workpieces to maintain them in firm contact, preheating the facing surfaces of the workpieces to raise the temperature thereof, thus causing an expansion of the metal thereof to effect an increase in the contacting pressure and in the electrical resistance of the workpieces, continuing such preheating and the application of such pressure until at least part of the metal of the facing surfaces has entered the liquidus phase, thereupon simultaneously substantially increasing the steady pressure on the workpieces and effecting a flow of electric welding current across the weld zone to bring all of the metal of the facing surfaces within the liquidus phase, and then discontinuing the electric welding current while maintaining the workpieces in set relation for at least a limited time after such current discontinuation.

3. A method of weld uniting metal workpieces comprising juxtaposing the workpieces with facing surfaces in abutting relation, applying a steady pressure to said workpieces to maintain them in firm contact, flame preheating the facing surfaces of the workpieces to raise the temperature thereof to effect an increase in the electrical resistance of the workpieces and causing an expansion of the metal thereof, continuing such flame preheating and the application of such pressure until at least part of the metal of at least one of the facing surfaces has entered the liquidus phase, thereupon simultaneously substantially increasing the steady pressure on the workpieces and effecting a flow of electric welding current across the weld zone to bring all of the metal of the facing surfaces within the liquidus phase, and then discontinuing the electric welding current while maintaining the workpieces in set relation for at least a limited time after such current discontinuation.

4. A method of weld uniting metal workpieces comprising reducing the facing surface of one of the workpieces to reduce the area of contact of the workpieces, juxtaposing the workpieces with facing surfaces in abutting relation, applying a steady pressure to said workpieces to maintain them in firm contact, flame preheating the facing surfaces of the work pieces to raise the temperature thereof, thus causing an expansion of the metal thereof to effect an increase in the contact pressure and in the electrical resistance of the work pieces, continuing such flame preheating and the application of such pressure until at least part of the metal of at least one of the facing surfaces has entered the liquidus phase, thereupon simultaneously substantially increasing the steady pressure on the workpieces and effecting a flow of electric welding current across the weld zone to bring all of the metal of the facing surfaces within the liquidus phase, and then discontinuing the electric welding current while maintaining the workpieces in set relation for at least a limited time after such current discontinuation.

5. The method of weld uniting together metallic workpieces, consisting of a thick walled alloy steel nozzle and a section of a thick steel plate with the nozzle normal to the surface of the plate and communicating with an opening in the latter, comprising reducing the weld end of the nozzle by tapering it towards its longitudinal axis and internal diameter to provide an inner plate contact surface of reduced area and, with the plate, an outwardly opening annular weld groove; juxtaposing the small diameter tapered end of the nozzle in contact with the plate and with the bore of the nozzle in alignment with the opening in the plate; applying a steady pressure to the workpieces to maintain the workpieces pressed together at the contact zone; flame preheating contacted parts and the metal forming the sides of the weld groove uniformly about the annular zone thereby effecting a temperature gradient across the weld zone with its minimum within the temperature range of the solidus phase of the metal at the contact zone, such preheating effecting an increase in the electrical resistance of the workpieces and causing an expansion of the metal thereof to effect an increase in the contacting pressure; continuing the preheating until the metal in the contact zone begins to upset; then applying for a short time interval an electric current across the weld zone thereby evening out said temperature gradient by effecting a substantially uniform liquidus phase temperature across the weld zone and causing a magnetic expulsion from the weld zone of molten material containing any oxides or other impurities which may have been present in the weld zone; applying greatly increased steady converging pressures on said workpieces simultaneously with said electric current application to stop said expulsion and produce the weld, discontinuing the application of electric current; and allowing the weld to set as the workpieces are maintained in set relation.

HOWARD J. KERR.
OTIS R. CARPENTER.
FRANK W. ARMSTRONG, Jr.
NICHOLAS C. JESSEN.

REFERENCES CITED

The following references are of record in the file of this patent:

UNITED STATES PATENTS

| Number | Name | Date |
|---|---|---|
| 419,032 | Coffin | Jan. 7, 1890 |
| 1,031,812 | Nailler | July 9, 1912 |
| 2,202,405 | Smith | May 28, 1940 |
| 2,250,869 | Jones et al. | July 29, 1941 |
| 2,250,870 | Jones et al. | July 29, 1941 |
| 2,272,968 | Dyer | Feb. 10, 1942 |
| 2,301,173 | Blum et al. | Nov. 10, 1942 |
| 2,354,983 | Blum et al. | Aug. 1, 1944 |

FOREIGN PATENTS

| Number | Country | Date |
|---|---|---|
| 10,241 | Great Britain | 1886 |